(12) United States Patent
Kim et al.

(10) Patent No.: US 7,925,107 B2
(45) Date of Patent: Apr. 12, 2011

(54) ADAPTIVE VARIABLE BLOCK TRANSFORM SYSTEM, MEDIUM, AND METHOD

(75) Inventors: Wooshik Kim, Yongin-si (KR); Dmitri Birinov, Yongin-si (KR); Hyun Mun Kim, Seongnam-si (KR); Daesung Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1238 days.

(21) Appl. No.: 11/489,483

(22) Filed: Jul. 20, 2006

(65) Prior Publication Data

US 2007/0025631 A1 Feb. 1, 2007

(30) Foreign Application Priority Data

Jul. 21, 2005 (KR) .................. 10-2005-0066350

(51) Int. Cl.
  *G06K 9/36* (2006.01)
  *H04N 7/12* (2006.01)
(52) U.S. Cl. .................. 382/248; 375/240.24
(58) Field of Classification Search .................. 382/234, 382/244, 248, 250, 251, 276; 375/240.03, 375/240.11, 240.18, 240.2, 240.24; 704/203; 708/402; 600/407

See application file for complete search history.

(56) References Cited

U.S. PATENT DOCUMENTS

| | | | | | |
|---|---|---|---|---|---|
| 4,829,465 | A | * | 5/1989 | Knauer | 708/402 |
| 5,097,331 | A | * | 3/1992 | Chen et al. | 375/240.11 |
| 5,418,714 | A | * | 5/1995 | Sarver | 600/407 |
| 5,651,089 | A | * | 7/1997 | Teh | 704/203 |
| 5,999,655 | A | * | 12/1999 | Kalker et al. | 382/234 |
| 6,154,493 | A | * | 11/2000 | Acharya et al. | 375/240.19 |
| 7,031,390 | B2 | * | 4/2006 | Thyagarajan | 375/240.24 |
| 7,305,139 | B2 | * | 12/2007 | Srinivasan et al. | 382/248 |
| 7,480,417 | B2 | * | 1/2009 | Malvar | 382/244 |

* cited by examiner

*Primary Examiner* — Kanji Patel
(74) *Attorney, Agent, or Firm* — Staas & Halsey LLP

(57) ABSTRACT

A variable block transform system, medium, and a system, medium, and method for video encoding/decoding using the variable block transform. The system includes a transform block size determination unit that determines the transform block size for components of an input video based on a format, defining the components, of the input video or characteristics of the components, and a transform coding unit that performs transform coding on each of the color components of the input video according to the determined transform block sizes and outputs transform coefficients.

47 Claims, 6 Drawing Sheets

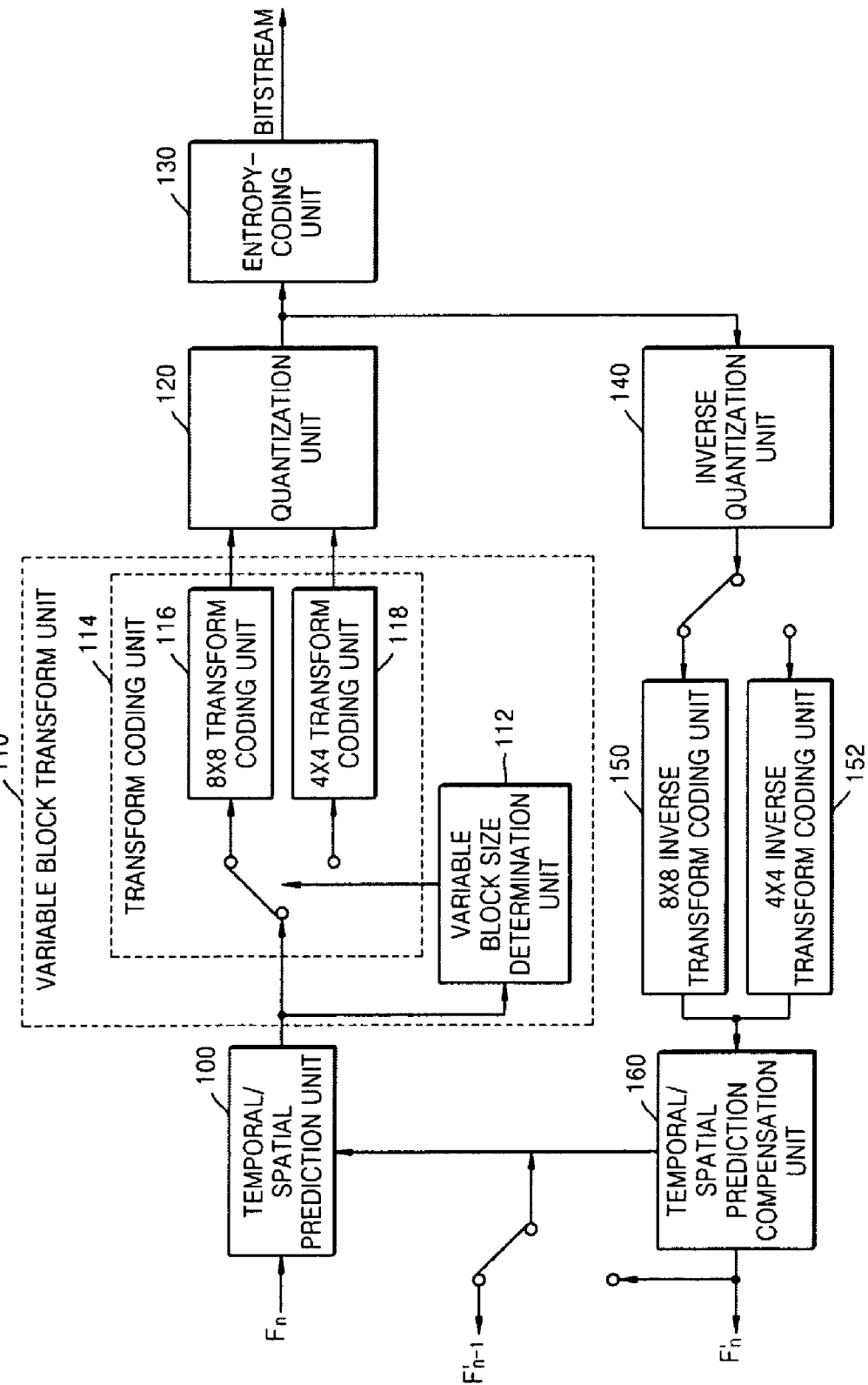

| P₀ | P₁ | P₂ | P₃ | P₄ | P₉ | P₁₀ | P₁₁ | P₁₂ |
|----|----|----|----|----|----|-----|-----|-----|
| P₅ | pₐ | p_b | p_c | p_d | | | | |
| P₆ | pₑ | p_f | p_g | p_h | | | | |
| P₇ | pᵢ | pⱼ | p_k | p_l | | | | |
| P₈ | p_m | p_n | p_o | p_p | | | | |

ADAPTIVE VARIABLE BLOCK TRANSFORM SYSTEM, MEDIUM, AND METHOD

CROSS-REFERENCE TO RELATED APPLICATIONS

This application claims the priority benefit of Korean Patent Application No. 10-2005-0066350, filed on Jul. 21, 2005, in the Korean Intellectual Property Office, the disclosure of which is incorporated herein in its entirety by reference.

BACKGROUND OF THE INVENTION

1. Field of the Invention

Embodiments of the present invention relate to an adaptive variable block transform system, medium, and method, including at least a system, medium, and method for adaptive variable block transforming and a system, medium, and method for video encoding/coding for variable block coding, and more particularly, an adaptive variable block transform system, medium, and method for variable block transform, in which high compression efficiency can be obtained by performing a variable block transform based on various video characteristics, including at least a color format and/or the characteristics of components of a respective color system. The variable block transform may be performed on not only luminance components or one color component, for example, but also remaining chrominance or other color components, for example.

2. Description of the Related Art

In conventional video compression, to encode a temporal sequence of image frames, each of the image frames is divided into blocks of a predetermined size, for example, and redundant information of each of the blocks is removed through compression, e.g., using transform coding. In recently standardized ISO/IEC MPEG and H.264/AVC (ITU-T Recommendation H.264 and ISO/IEC 14496-10 (MPEG-4 part 10) Advanced Video Coding) of Joint Video Team of ITU-T VCEG, which will herein be referred to as the current H.264/AVC, 4×4 integer transform is basically used, with discrete cosine (DC) transform being additionally performed on DC components of each of 4×4 blocks of a 16×16 macroblock. At the same time, a 8×8 transform is performed on only luminance components. In this case, luminance components of every block or macroblock of an image frame will be transform-coded using 4×4 or 8×8 transform.

However, as predefined in the current H.264/AVC, as noted, 4×4 or 8×8 transform is performed only on luminance components, with only a 4×4 transform being performed on chrominance components. This is because the current H.264/AVC was initially developed only for the YCbCr 4:2:0 format, in which chrominance components of an input image are sub-sampled at ¼ of the sub-sampling of the luminance components of the input image. However, with the increasing demands for high-quality images, there has been a suggestion to expand the current H.264/AVC to support not only YCbCr 4:2:0 but also YCbCr 4:2:2, YCbCr 4:4:4, as well as RGB or alternate XYZ formats, i.e., image information represented by multiple components other than the RGB and YCbCr formats. However, during such an expansion of the current H.264/AVC, different block transform coding is not correctly applied for these different formats. Therefore, to achieve low quality loss and high compression rates during compression of a high-quality image, there is a need for a method for applying block transform suitable for both luminance and chrominance components. In addition, there is a need for a color component adaptive transform system, medium, or method that makes the most of a conventional technique, e.g., the current H.264/AVC standard, with minimum changes.

SUMMARY OF THE INVENTION

Embodiments of the present invention provide a system, medium, and method with variable block transform, including encoding/decoding using such variable block transforms, where a transform block size can be varied adaptively according to given video characteristics, e.g., a corresponding detected color format or characteristics of each component of received image information, e.g., for video coding, thereby improving compression efficiency in video data compression.

Additional aspects and/or advantages of the invention will be set forth in part in the description which follows and, in part, will be apparent from the description, or may be learned by practice of the invention.

To achieve the above and/or other aspects and advantages, embodiments of the present invention include a system for variable block transform, including transform block size determination unit to designate at least one transform block size for components of an input video, based on a format of the input video, defining the components, and/or respective characteristics of the components, and a transform coding unit to perform transform coding on each of the components according to the designated at least one transform block size.

The transform coding unit may further output transform coefficients based upon the performed transform coding.

In addition, the transform block size determination unit may designate the at least one transform block size for each of the components according to a predetermined rule.

The predetermined rule may include designating a same transform block size to all components in a group, wherein components are grouped according to related characteristics, and with there being at least two groups of components.

The transform block size determination unit may designate a same transform block size for a Cb component and a Cr component when the format is a YCbCr color format. Similarly, the transform block size determination unit may designate a same transform block size for an R component, a G component, and a B component when the format is an RGB color format. The transform block size determination unit may designate a same transform block size for an R component and a B component when the format is an RGB color format.

The transform block sizes may be selectively designated to be one of 4×4 and 8×8.

To achieve the above and/or other aspects and advantages, embodiments of the present invention include a method for variable block transform, including designating at least one transform block size for components of an input video, based on a format of the input video, defining the components, and/or respective characteristics of the components, and performing transform coding on each of the components according to the designated at least one transform block size.

The method may further generate transform coefficients based upon the performed transform coding.

In the designating of the at least one transform block size, a same transform block size is designated for a Cb component and a Cr component when the format is an YCbCr color format. Similarly, in the designating of the at least one transform block size, a same transform block size may be designated for an R component, a G component, and a B component when the format is an RGB color format.

To achieve the above and/or other aspects and advantages, embodiments of the present invention include a video encoder, including a variable block transform unit to perform transform coding on components of an input video, based on a format of the input video, defining the components, and/or respective characteristics of the components of the input video, and to output corresponding transform coefficients, and a quantization unit to quantize the transform coefficients.

The variable block transform unit may include a transform block size determination unit to designate at least one transform block size based on the format and/or the corresponding characteristics of the components, and a transform coding unit to perform transform coding on each of the components based on the designated at least one transform block size.

The video encoder may further include an entropy-coding unit to perform entropy-coding on the quantized coefficients and to output the entropy-coded coefficients as a bitstream.

The entropy-coding unit may perform entropy-coding on information about the designated at least one transform block size.

The transform block size determination unit may designate the designated at least one transform block size for each of the components according to a predetermined rule, and the entropy-coding unit may perform the entropy-coding on the information about the designated at least one transform block size, and outputs the entropy-coded information as a bitstream.

The predetermined rule may include designating a same transform block sizes to all components in a group, wherein components are grouped according to related characteristics, and with there being at least two groups of components, and the entropy-coding unit may perform the entropy-coding on the information about the designated at least one transform block size, as designated for each group.

The transform block size determination unit may designate a same transform block size for a Cb component and a Cr component when the format is an YCbCr color format, and the entropy-coding unit may perform the entropy-coding on only one of information about the same transform block size of the Cb component and information about the same transform block size of the Cr component.

The transform block size determination unit may similarly designate a same transform block size for an R component, a G component, and a B component when the format is an RGB color format, and the entropy-coding unit may perform the entropy-coding on only one of information about the same transform block size of the R component, information about the same transform block size of the G component, and information about the same transform block size of the B component.

The transform coding unit may collect DC coefficients for each of color components from the transform coefficients, performs Hadamard transform on the collected DC coefficients, and outputs the Hadamard-transformed transform coefficients.

In addition, when the at least one designated transform block size is 8×8, the transform coding unit may collect four DC coefficients for each of the components from the transform coefficients in four 8×8 blocks, perform 2×2 Hadamard transform on the collected DC coefficients, and output the Hadamard-transformed transform coefficients.

To achieve the above and/or other aspects and advantages, embodiments of the present invention include a video encoding method, including performing transform coding on components of an input video based on a format of the input video, defining the components, and/or respective characteristics of the components, and generating corresponding transform coefficients, and quantizing the transform coefficients for generating an encoded video bitstream.

The performing of the transform coding may include designating at least one transform block size based on the format and/or the respective characteristics of the components, and performing transform coding on each of the components of the input video based on the designated at least one transform block size.

The method may further include performing entropy-coding on the quantized coefficients and outputting the entropy-coded coefficients as a bitstream.

In the performing of the entropy-coding, the entropy-coding may be performed on information about the designated at least one transform block size.

In the designating of the at least one transform block size, a same transform block size may be designated for a Cb component and a Cr component when the format is an YCbCr color format, and the entropy-coding may be performed on only one of information about the same transform block size of the Cb component and information about the same transform block size of the Cr component. Similarly, in the designating of the at least one transform block size, a same transform block size may be designated for an R component, a G component, and a B component when the format is an RGB color format, and the entropy-coding may be performed on only one of information about the same transform block size of the R component, information about the same transform block size of the G component, and information about the same transform block size of the B component.

To achieve the above and/or other aspects and advantages, embodiments of the present invention include a video decoder for decoding encoded input video data, including a variable block inverse transform unit to perform variable block inverse transform on inversely quantized data related to components of the input video data based on a format of the input video data, defining the components, or respective characteristics of the components using predetermined corresponding transform block size information provided for and/or with the encoded input video data.

The decoder may further include an inverse quantization unit to inversely quantize the encoded input video data.

The variable block inverse transform unit may include a transform block size determination unit determine at least one previously designated transform block size for the components based on the format and/or the respective characteristics of each of the components, using the provided predetermined corresponding transform block size information, and an inverse transform coding unit to perform inverse transform coding on each of the components of the inversely quantized data based on the determined at least one transform block size.

The video decoder may include an entropy-decoding unit to perform entropy-decoding an input bitstream and to output the encoded input video data.

The entropy-decoding unit may perform entropy-decoding of the input bitstream to decode the provided predetermined corresponding transform block size information.

In addition, the transform block size determination unit may determine the previously designated transform block size for each of the components based on a predetermined rule using the provided predetermined corresponding transform block size information.

Further, the predetermined rule may include having a same transform block size designated to all components in a group, wherein components are grouped according to related characteristics, and with there being at least two groups of components, and the transform block size determination unit extracts transform block size of each group using the provided predetermined corresponding transform block size information and correspondingly determines the previously designated transform block size for each of the components.

The transform block size determination unit may determine a same transform block size was previously designated for a Cb component and a Cr component when the format is an YCbCr color format, using the provided predetermined corresponding transform block size information. Similarly, the transform block size determination unit may determine a same transform block size was previously designated for an R component, a G component, and a B component when the format is an RGB color format, using the provided predetermined corresponding transform block size information.

The inverse transform coding unit may collect DC coefficients for each of the components of the inversely quantized data and performs inverse transform coding on data obtained through an inverse Hadamard transform of the collected DC coefficients and AC coefficients.

To achieve the above and/or other aspects and advantages, embodiments of the present invention include a video decoding method, including performing transform coding on components of an encoded input video based on a format of the encoded input video, defining the components, and/or respective characteristics of the components of the encoded input video and generating corresponding transform coefficients, and quantizing the transform coefficients for decoding the encoded input video.

The quantizing of the transform coefficients may include determining at least one previously designated transform block size for the components based on the format and/or each of the respective characteristics of the components using predetermined corresponding transform block size information provided for and/or with the encoded input video data, and performing inverse transform coding on each of the components of the inversely quantized data according to the determined at least one transform block size.

The method may further include performing entropy-decoding on an input bitstream to obtain the encoded input video data.

Here, in the performing of the entropy-decoding, the entropy-decoding may be performed on the input bitstream to obtain the predetermined corresponding transform block size information.

In the determining of the at least one transform block size, a same transform block size may be determined for a Cb component and a Cr component when the format is an YCbCr color format, using the predetermined corresponding transform block size information. Similarly, in the determining of the at least one transform block size, a same transform block size may be determined for an R component, a G component, and a B component when the format is an RGB color format, using the predetermined corresponding transform block size information.

To achieve the above and/or other aspects and advantages, embodiments of the present invention include a medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 illustrates a variable block transform system, as a video encoder using variable block transform, according to an embodiment of the present invention;

DETAILED DESCRIPTION OF THE PREFERRED EMBODIMENTS

Figure 2A:
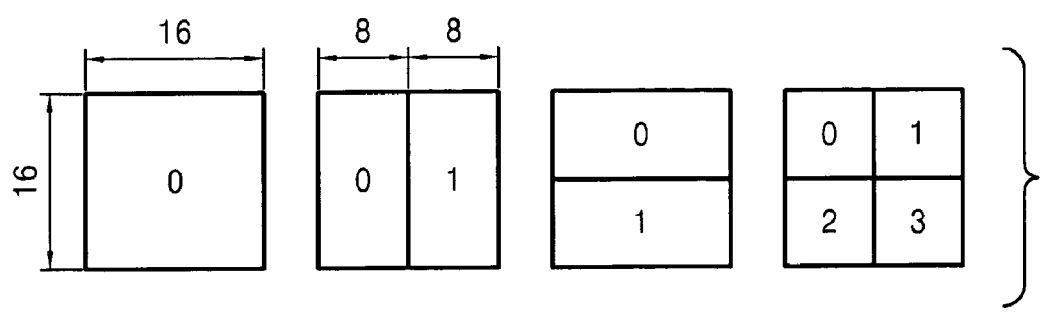
FIGS. 2A and 2B illustrate divisions of a macroblock for temporal prediction.

Reference will now be made in detail to embodiments of the present invention, examples of which are illustrated in the accompanying drawings, wherein like reference numerals refer to the like elements throughout. Embodiments are described below to explain the present invention by referring to the figures.

An image obtained from a camera generally is obtained in an RGB color format. Such an RGB image is then typically transformed adaptively to each application field and corresponding format. A color format generally used in a video compression field is YCbCr, where Y represents a luminance component and Cb and Cr represent chrominance components. However, since YCbCr is limited in expressing high image quality, an RGB color format or any XYZ color format may be used for greater image quality.

Transform coding is performed during video compression, where an image is divided into blocks of a predetermined size, for example, and is transformed into a frequency domain for coding. At this time, compression efficiency can be improved by performing variable block transform coding according to the characteristics of the image. Variable block transform coding uses blocks of different sizes according to the characteristics of the image.

The input image or series of images may be temporally and spatially predicted in units of a predetermined-size block. A predicted pixel value is then extracted from a pixel value of a predetermined-size current block to be encoded. Here, a prediction-encoded value removes redundant information of a block through a transform such as discrete cosine transform (DCT), Hadamard transform, or integer transform. During this process, information of a block is concentrated on low-frequency coefficients, as high-frequency components do not have much information. Generally, as a block size increases, the beneficial results from transform coding improve because more redundant information is removed. However, as the block sizes increase, the performance of prediction coding used in a temporal/spatial prediction unit becomes degraded. For example, in an intra prediction mode, if the block size is small, prediction can be performed using neighboring pixel values, thereby efficiently performing prediction coding. Thus, according to the respective characteristics of images, prediction coding may be more efficient with a larger block size for some images by making the most of transform coding, or with smaller block sizes for other images by making the most of temporal/spatial prediction coding. In the current H.264/AVC, the available optimized block sizes are selected between 4×4 and 8×8 for the coding of a luminance block, while a fixed block size of 4×4 is used for the coding of a chrominance block, i.e., the block sizes for the chrominance blocks are not variable. At this time, the selected block size is coded by an entropy-coding unit after being included in a bitstream. Conversely to these conventional systems, embodiments of the present invention permit for a varying of the block sizes of the chrominance blocks.

Thus, according to embodiments of the present invention, selectable variable block transform can be performed on chrominance components, with determined corresponding transform block size can be applied based on the characteristics of the underlying format of the image, e.g., with the application being based on color components potentially differently. In embodiments of the present invention, during an encoding of a video variable block transform coding may be efficiently performed according to characteristics of each color component, for example, in a format of the video. Further, in an embodiment of the present invention, a block size suitable for individual characteristics of a given color component, for example, may be used for transform coding, where separate selectable independent block sizes may be available for each color component or the same block sizes may bed used for all the color components, thereby achieving high compression/decompression efficiency in a video having various characteristics.

FIG. 1 illustrates a variable block transform system, as a video encoder using variable block transform, according to an embodiment of the present invention. The video encoder may include a temporal/spatial prediction unit 100, a variable block transform unit 110, a quantization unit 120, an entropy-coding unit 130, an inverse quantization unit 140, an 8×8 inverse transform coding unit 150, a 4×4 inverse transform coding unit 152, and a temporal/spatial prediction compensation unit 160, for example.

Here, a current image frame to be encoded is represented by 'Fn'. An image frame may be encoded in units of a predetermined-size block (generally a 16×16 macroblock), for example, with an inter prediction mode and an intra prediction mode being available for the encoding. The inter prediction mode uses temporal prediction in which a motion is estimated in a reference frame for prediction, and the intra prediction mode uses spatial prediction in which pixel values of neighboring blocks in a reference frame are used for prediction. Here, as illustrated in FIG. 1, the reference frame is formed based on a reconstructed frame in any of the inter prediction mode and the intra prediction mode, and thus, $F'_{n-1}$ is used in the intra prediction mode and $F'_n$ is used in the inter prediction mode.

The temporal/spatial prediction unit 100 performs temporal/spatial prediction on the reference frame to generate a block that is similar to a current block that is being encoded in the current frame $F_n$, subtracts pixel values of the generated block from pixel values of the current block, and outputs a result of the subtraction. In other words, in temporal/spatial prediction, motion is estimated in a previous frame $F'_{n-1}$ for predicting the current block of the current frame $F_n$.

The variable block transform unit 110 designates the size of a transform block to be transform coded based on the format of the input video or individual components, within the format, for the video, and then performs transform coding for each component according to the designated size of the transform block.

The variable block transform unit 110 may include a transform block size determination unit 112 and a transform coding unit 114 as illustrated in FIG. 1.

According to an embodiment of the present invention, the transform block size determination unit 112 designates a transform block size based on the color format of the input video or individual respective color components and provides the designated size to the transform coding unit 114.

For the designation of the transform block size, regardless of the characteristics of a color format, an example color format will be referenced as including a first component, a second component, and a third component, noting that alternative embodiments are equally available. A transform block size suitable for each of the first component, the second component, and the third component may be designated collectively or independently, and/or the transform block size may be designated for each of the first component, the second component, and the third component according to a predetermined rule. For example, the rule may be such that 2×2 or 4×4 is designated to be the transform block size for the first component and 4×4 or 8×8 is designated to be the transform block size for the second component and/or the third component. The rule may also use grouping. In other words, the rule may be preset at an encoder/decoder such that color components expected to correspond to the same transform block size are grouped and that the transform block size is similarly designated within each group. For example, the same transform block size may be designated for any two of the first component, the second component, and the third component, e.g., the second component and the third component, or the same transform block may be used for all of three components. As such, when the same transform block size can be designated for the second component and the third component, e.g., as the second group, because the two components have similar characteristics, only transform block size information for the first component, as the first group, and transform block size information for the second group are transmitted in transform coding information, according to the rule, thereby reducing the required amount of transmission data.

One optimal transform block size may be designated based on both the amount of transmission data and video quality obtained by applying coding to color components for all the transform block sizes according to the foregoing rule, for example. The designation may also be performed using a cost function that may vary with the amount of transmission data and video quality, for example.

According to an embodiment of the present invention, in the case of a YCbCr color format, one optimal transform block size may be independently designated for each of the Y, Cb, and Cr components. However, considering the characteristics of YCbCr, a large amount of information is concentrated in the Y component, the luminance component, while there is a relatively small amount of information in the Cb and Cr components, the chrominance components. In other words, there is little correlation between the luminance and chrominance components. According to an embodiment of the present invention, since the Cb and Cr components have similar characteristics to each other, it may be more expedient to designate the same transform block size for both chrominance components for their block transform, instead of independently determining which transform block size should be designated for each of the respective three color components. Such an independent determination for each of the three color components requires the coding of additional information about transform block sizes for designating each of the three color components, while using the same coded information for determining the transform block size designation for at least two components, such as the chrominance components, requires less coding information, thereby reducing the amount of transmission data.

The YCbCr color format includes 4:2:0, 4:2:2, and 4:4:4 formats according to sampling rate. Here, as an example, the 4:2:0 and 4:4:4 formats will be described. As mentioned above, the current H.264/AVC uses only 4×4 transform for chrominance components. This is because YCbCr 4:2:0 is targeted. To overcome the resulting disadvantage, the current H.264/AVC performs DC transform on DC components of each block using Hadamard transform.

According to an embodiment of the present invention, an optimal transform block size may be determined based on the expanded formats YCbCr 4:2:2 and YCbCr 4:4:4 of H.264/AVC for effective variable block transform coding. In the case of YCbCr 4:4:4, since each component is equally sub-sampled, it may be desirable to perform transform coding on not only a luminance component but also chrominance components using 4×4 or 8×8, for example, as a transform block size. In other words, for transform coding, an optimal transform block size between 4×4 and 8×8 may be separately designated for each of the Cb component and the Cr component or the same transform block size may be designated for both the Cb component and the Cr component. As noted above, when different transform block sizes are used for the Cb component and the Cr component, transform block size information for the three color components should be transmitted, thus requiring additional transmission data. In an alternative embodiment, when the same transform block size is used for both the Cb component and the Cr component, transform block size information only for the luminance component and the chrominance components, as a group, is transmitted, thereby reducing the amount of transmission data. The determination of the optimal transform block size may also be performed using the aforementioned cost function.

Similarly, in the case of YCbCr 4:2:0, where the sampling of the chrominance components is sub-sampled at a rate ¼ of that of the luminance component, the transform block size of 4×4 or 8×8, for example, may selectively be used for the chrominance components, an optimal transform block size may designated in various ways, like in YCbCr 4:4:4, and information about the determined transform block size transmitted. However, as noted above, in the current H.264/AVC only a transform block size of 4×4 must be used. In this case, according to an embodiment of the present invention, since a decoder can recognize that 4×4 transform coding has been performed on both chrominance components of a received video, based on the fact that the color format of the received video is YCbCr 4:2:0 without the requirement of additional information, it can decode the received video by performing 4×4 inverse transform coding. Thus, it is not necessary to transmit transform block size information for the chrominance components by basing a transform block size based upon the format of the video, e.g., YCbCr 4:2:0 or YCbCr 4:4:4, thereby reducing the amount of transmission data.

According to another embodiment of the present invention, when the video format is RGB, one optimal transform block size may be designated for each of R, G, and B components for transform coding. Similar to the YCbCr video format, two transform block sizes, for example, may be used for the G component, corresponding to luminance, and the R and B components, corresponding to chrominance, and be encoded in a bitstream. In other words, the transform block size may be designated for the G component similar to the aforementioned Y luminance component, since the G component has more luminance components than the R and B components, and the same transform block size may be designated for the R and B components. In this case, it may only be necessary to transmit information about two transform block sizes for the three components, thereby reducing the amount of transmission data. As an alternative, since the three components R, G, and B all have luminance components and chrominance components, they have high similarity and it may be more desirable to designate the same transform block size for the three components than to designate different transform block sizes for the three components. In this case, it may only be necessary to transmit information about a single transform block size, for all three components, to a decoder, thereby again reducing the amount of transmission data.

According to an embodiment of the present invention, the transform coding unit 114 may include a 4×4 transform coding unit 116 and an 8×8 transform coding unit 118, as illustrated in FIG. 1. Although 4×4 and 8×8 transform coding units have been illustrated as examples of a transform block size, in consideration of H.264, various alternative functional units for performing transform coding on transform blocks of various sizes may be included according to an applied video technique.

Whether to perform transform coding through the 4×4 transform coding unit 114 or the 8×8 transform coding unit 118 can determined based on the output of the transform block size determination unit 112.

The 4×4 transform coding unit 114 and the 8×8 transform coding unit 118 may use orthogonal transform coding for transform coding. Here, fast Fourier transform (FFT), discrete cosine transform (DCT), Karhunen-Loeve transform (KLT), Hadamard transform, and slant transform are commonly used for orthogonal transform coding.

Transform coefficients, as outputs of the transform coding unit 114, include DC coefficients and AC coefficients. Since DC coefficients within a macroblock have correlation, they may be collectively Hadamard-transformed, for example. Since the current H.264/AVC uses only 4×4 as a transform block size for chrominance components, 4 DC coefficients are generated for each macroblock in the case of YCbCr 4:2:0 and thus, 2×2 Hadamard-transform is performed.

However, when both 4×4 transform and 8×8 transform are performed for chrominance components, various types of Hadamard transforms may be used. First, in the case of YCbCr 4:2:0, 4 DC coefficients and 1 DC coefficient are generated for each macroblock, respectively, for 4×4 and 8×8 transform block sizes used for chrominance components. Thus, 2×2 Hadamard transform may be performed for the 4 DC coefficients and no Hadamard transform is required for the 1 DC coefficient. In the case of YCbCr 4:4:4, 16 DC coefficients and 4 DC coefficient would be generated for each macroblock, respectively, for 4×4 and 8×8 transform block sizes used for chrominance components. Thus, 4×4 Hadamard transform may be performed for the 16 DC coefficients and 2×2 Hadamard transform may be performed for the 4 DC coefficients. The following is an example of 2×2 Hadamard transform.

Equation 1: (1)

$$\begin{bmatrix} h_{00} & h_{10} \\ h_{01} & h_{02} \end{bmatrix} = \begin{bmatrix} 1 & 1 \\ 1 & -1 \end{bmatrix} \begin{bmatrix} d_{00} & d_{10} \\ d_{01} & d_{11} \end{bmatrix} \begin{bmatrix} 1 & 1 \\ 1 & -1 \end{bmatrix}$$

Here, $d_{00}$, $d_{01}$, $d_{10}$, and $d_{11}$ are the collectively processed DC coefficients and $h_{00}$, $h_{01}$, $h_{10}$, and $h_{11}$ are data resulting from Hadamard transform.

The quantization unit 120 quantizes transform coefficients obtained through transform coding. When Hadamard transform is performed, the Hadamard-transformed DC coefficients are quantized. When a quantization method is changed, according to a transform block size, the transform block size determination unit 112 may provide information about the transform block size used to the quantization unit 120.

The entropy-coding unit 130 may perform entropy-coding on quantized data, and the entropy-coded data can be transmitted to a network abstraction layer in the form of a bitstream, so as to be stored or transmitted, for example. When necessary, a prediction mode of a macroblock, a quantization step size, motion vector information, and transform block size information may also be entropy-coded. The rearrangement of the order of the quantized data may also be performed prior to the entropy-coding.

The generation of a reference frame through the reconstruction of data will now be described.

The inverse quantization unit 140 inversely quantizes an input from the entropy-coding unit 130, i.e., the quantized data.

Next, the inversely quantized data is inversely transformed by one of the 8×8 inverse transform coding unit 150 and the 4×4 inverse transform coding unit 152, for example, according to a transform block size used for the coding of each video format component. Selection can be made between the 8×8 inverse transform coding unit 150 and the 4×4 inverse transform coding unit 152 based on various factors, such as using transform block size information input from the entropy-coding unit 130 or buffering a transform block size used in the transform block size determination unit 112, for example.

Next, the temporal/spatial prediction compensation unit 160 temporally/spatially predicts a block to be decoded based on a reference frame, a motion compensation vector to be transmitted, and spatial prediction direction information and adds the predicted block to the inversely transform coded data, thereby generating $F'_n$. Like the temporal/spatial prediction unit 100, $F'_{n-1}$ is used as the reference frame in the inter prediction mode and a restored block of $F'_n$ is used in the intra prediction mode.

Figure 2B:
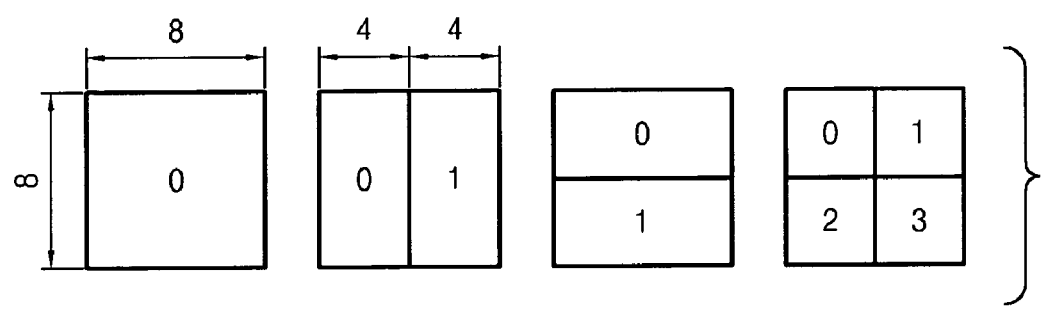

FIGS. 2A and 2B illustrate divisions of a macroblock for temporal prediction. Such division is used in ISO/IEC 14496-10 and ITU-T Rec. H.264 standards.

A block size for temporal prediction, i.e., a motion compensation block size varies from 16×16 to 4×4. As illustrated in FIG. 2A, a luminance component of each macroblock may be divided into four types of macroblock partitions, e.g., 16×16, 16×8, 8×16, and 8×8 macroblock partitions. Further, the 8×8 macroblock partition may be divided into 8×8, 8×4, 4×8, and 4×4 sub partitions, as illustrated in FIG. 2B. The partitions and the sub partitions may also have various combinations in each macroblock.

The same block size as the luminance block size may be used for the chrominance components, such as the YCbCr 4:4:4 format, but a block that is smaller than the luminance block size by ¼ may be used for the chrominance components, such as the YCbCr 4:2:0 format. Conversely, and as noted above, transform coding in the current H.264/AVC is performed for the luminance component using a block size of 8×8 or 4×4, but only a block size of 4×4 is used for the transform coding of the chrominance components.

Figures 3A, 3B:
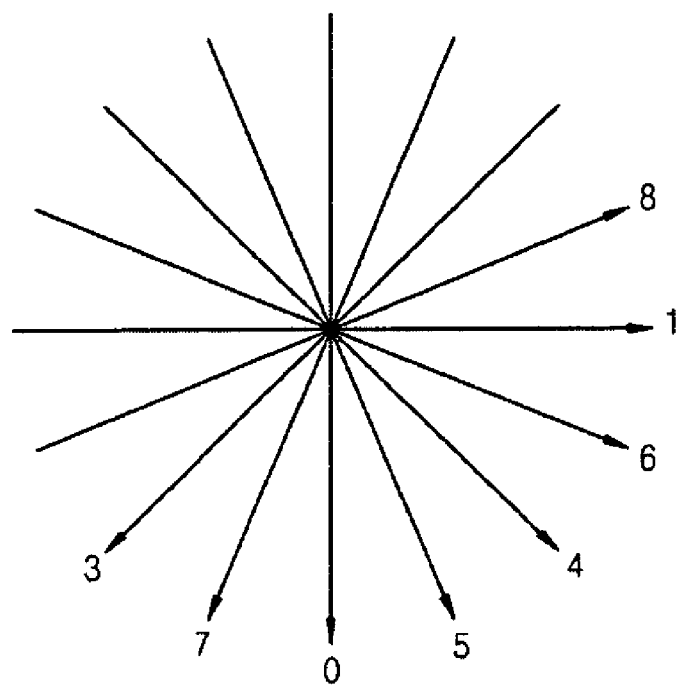
FIGS. 3A and 3B illustrate positions of pixels and prediction directions for 4×4 sub-block based spatial prediction.

FIG. 3A illustrates positions of pixels of a current block to be predicted and the positions of pixels adjacent to the current block used for 4×4 sub-block based spatial prediction, as used in ISO/IEC 14496-10 and ITU-T Rec. H.264 standards. In FIG. 3A, for the prediction of 4×4 block data (including pixels $p_a$, $p_b$, . . . , $p_q$), previously coded and restored data (including pixels $P_0$, $P_1$, . . . , $P_{12}$), spatially adjacent to the 4×4 block data, is used.

FIG. 3B illustrates 9 prediction directions from 0 to 8 for the prediction of the current block through projection from the spatially adjacent pixels. For example, in the direction 0, by perpendicularly projecting the adjacent pixels $P_1$, $P_2$, $P_3$, and $P_4$, $p_a$, $p_e$, $p_i$, and $p_m$ are predicted to be $P_1$; $p_b$, $p_f$, $p_j$, and $p_n$ are predicted to be $P_2$; $p_c$, $p_g$, $p_k$, and $p_o$ are predicted to be $P_3$; and $p_d$, $p_h$, $p_l$, and $p_q$ are predicted to be $P_4$. In the same manner as the direction 0, the pixels of the current block are predicted through projection in the other directions. In the direction 2, which is not illustrated in FIG. 3B, the pixels of the current block would be predicted to be averages of $P_1$, $P_4$, $P_5$, and $P_8$.

Figure 4:
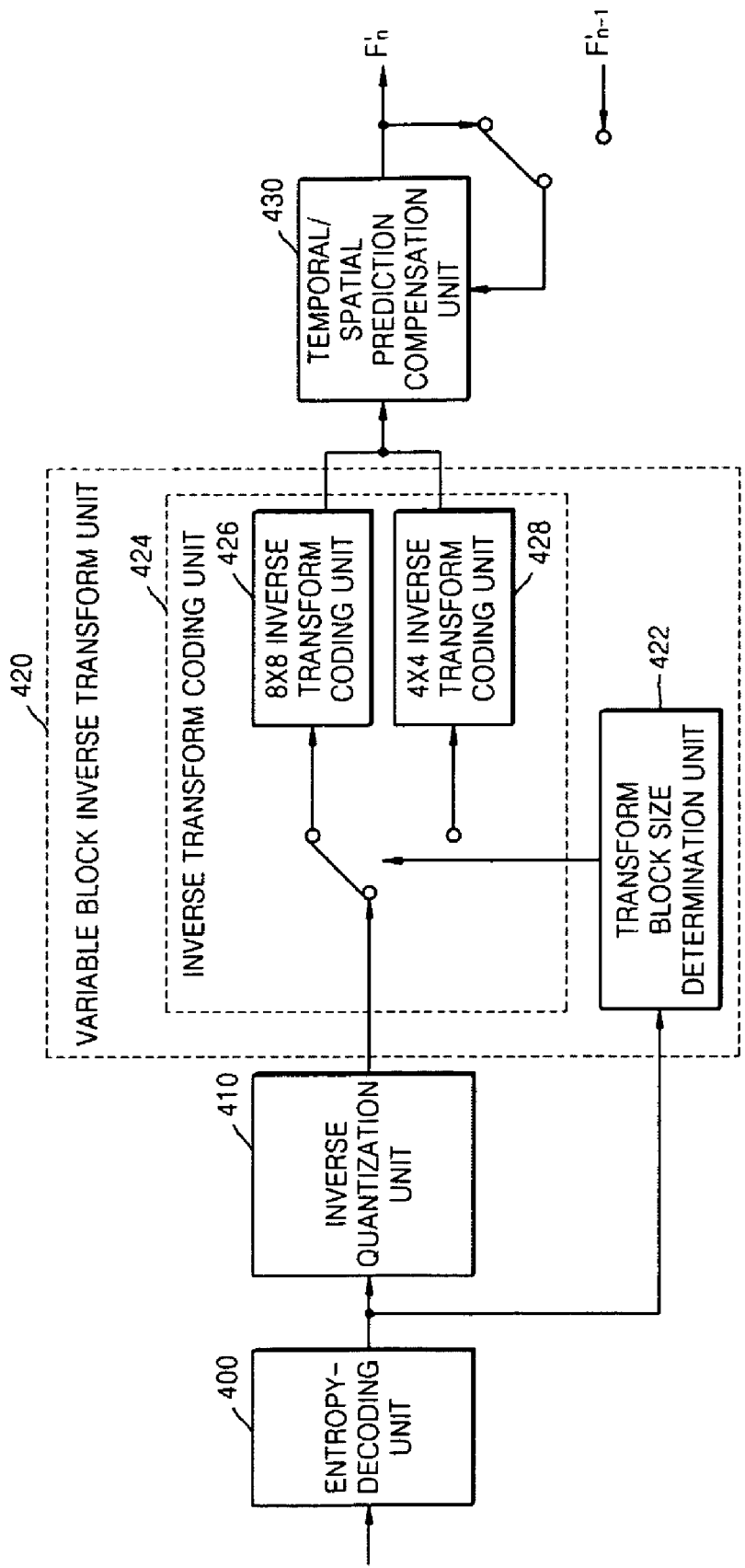
FIG. 4 illustrates a variable block transform system, as a video decoder using variable block transform, according to an embodiment of the present invention.

FIG. 4 illustrates a variable block transform system, as a video decoder using variable block transform, according to an embodiment of the present invention. The video decoder includes an entropy-decoding unit 400, an inverse quantization unit 410, a variable block inverse transform unit 420, and a temporal/spatial prediction compensation unit 430, for example.

The video decoder receives a compressed bitstream from the NAL, and the entropy-decoding unit 400 performs entropy-decoding on the received bitstream and outputs the decoded data to the inverse quantization unit 410. When the received bitstream includes a prediction mode of a macroblock, a quantization step size, motion vector information, and transform block size information, the entropy-decoding unit 400 may perform entropy-decoding on the included information for restoration. The rearrangement of the order of the quantized data may also be performed prior to the entropy-decoding.

The inverse quantization unit 410 inversely quantizes the entropy-decoded data and outputs the inversely quantized data to the variable block inverse transform unit 420.

The variable block inverse transform unit 420 performs inverse transform coding, such as inverse discrete cosine transform (IDCT), according to a designated transform block size for each color component using restored transform block size information provided from the entropy-decoding unit 400.

To this end, the variable block inverse transform unit 420 may include a transform block size determination unit 422 and an inverse transform coding unit 424.

The transform block size determination unit 422 may extract a transform block size for a current block to be decoded, e.g., using the transform block size information provided from the entropy-decoding unit 400, and provide the extracted transform block size to the inverse transform coding unit 424. If a rule in which a transform block size would have been independently designated for each component, regardless of a color format, the received bitstream may include three pieces of transform block size information, for example, and the entropy-decoding unit 400 may provide the decoded three pieces of transform block size information. The transform block size determination unit 422 may then determine the designated transform block size for each color component using the three pieces of transform block size information.

Similarly, an alternate rule may base the transform block size of separate groups, each including at least component, such that the transform block size determination unit 422 would extract the transform block size for each group using the transform block size information and determines the corresponding designated transform block size for each component in each respective group. For example, when a color system includes a first component in a first group and a second component and a third component in a second group, the received bitstream may include transform block size information for the first group and the second group, such that the transform block size determination unit 422 would determine the designated transform block size for the first component to be the transform block size of the first group and the transform block sizes of the second component and the third component to be the transform block size of the second group using the entropy-decoded transform block size information.

If a color format is YCbCr 4:2:0 and a setting is made to use only a transform block size of 4×4 for chrominance components in a video encoder/decoder, the received bitstream would not need to include transform block size information for the chrominance components, i.e., Cb and Cr components. In this case, the transform block size determination unit 422 could control the inverse transform coding unit 424 to perform 4×4 inverse transform coding.

If an alternative rule applies the same transform block size for both the Cb component and the Cr component, the transform block size determination unit 422 may be provided with a piece of transform block size information for the luminance component and a piece of transform block size information for both chrominance components from the entropy-decoding unit 400, and may then determine the corresponding designated transform block size for the Y component and the transform block size for the Cb and Cr components. Each color component of the inversely quantized data is inversely transform coded based on the determined transform block size.

If still another alternative rule applies the same transform block size for R, G, and B components, the transform block size determination unit 422 may be provided with a single piece of transform block size information from the entropy-decoding unit 400 and accordingly determines that the same transform block size was designated for all the R, G, and B components.

The inverse transform coding unit 424 may include an 8×8 inverse transform coding unit 426 and a 4×4 inverse transform coding unit 428, for example, and the appropriate 8×8 inverse transform coding unit 426 or 4×4 inverse transform coding unit 428 would perform inverse transform coding on the inversely quantized data, e.g., according to a control signal received from the transform block size determination unit 422, again noting that the 8×8 and 4×4 inverse transform coding units are merely examples and alternate inverse transform coding units are equally available.

The temporal/spatial prediction compensation unit 430 restores a block of a current frame F'$_n$ using a reference frame reconstructed through decoding and the inversely transform coded data. At this time, restored F'$_{n-1}$ is used as the reference frame in the inter prediction mode and a portion of restored F'$_n$ is used in the intra prediction mode. The temporal/spatial prediction compensation unit 430 then adds inversely transform coded data to the result of the temporal/spatial prediction of the reference frame, thereby restoring the block of the current frame F'$_n$. The restored block can then be used for the temporal/spatial prediction of a next block.

After the temporal/spatial prediction compensation unit 430 temporally/spatially predicts a block to be decoded using the reference frame, the motion vector information, and the spatial prediction direction information, it adds the predicted block to the inversely transform coded data, thereby generating F'$_n$. Like the temporal/spatial prediction unit 100, the temporal/spatial prediction compensation unit 430 uses F'$_{n-1}$ as the reference frame in the inter prediction mode and a restored block of F'$_n$ in the intra prediction mode.

Figure 5:
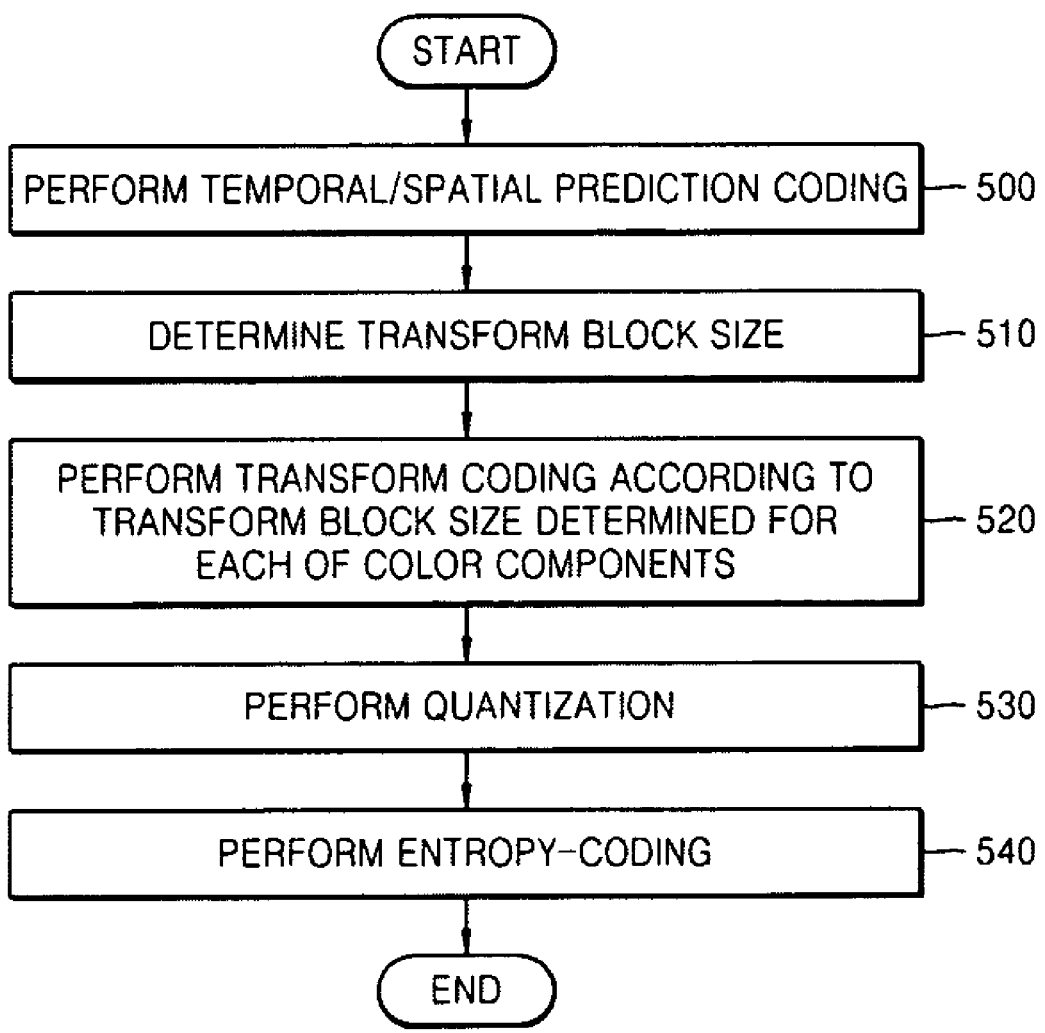
FIG. 5 illustrates a variable block transform method, as a video encoding method using variable block transform, according to an embodiment of the present invention.

FIG. 5 illustrates a variable block transform method, as a video encoding method using variable block transform, according to an embodiment of the present invention.

In operation 500, the temporal/spatial prediction unit 100 extracts a block that is similar to the current block to be encoded in the current frame F$_n$ from the reference frame and generates a difference between pixels of the two blocks as a subject to be transform coded. Here, the similar block indicates the foregoing temporally/spatially predicted block.

In operation 510, the transform block size determination unit 112 determines an optimal transform block size based on the format and/or individual components of an input video. The determination of the transform block size may be performed according to the aforementioned techniques.

In operation 520, the transform coding unit 114 performs transform coding on the output data of the temporal/spatial prediction unit 100 according to the determined transform block size. DC coefficients among transformed coefficients may be Hadamard-transformed if necessary, noting that transform coding and Hadamard transform may be performed in the manner as mentioned above.

In operation 530, the quantization unit 120 quantizes transform coefficients obtained through transform coding, and when Hadamard transform is performed, the Hadamard-transformed DC coefficients are quantized.

In operation 540, the entropy-coding unit 130 performs entropy-coding on the quantized data and transmits the entropy-coded data to the NAL, e.g., in the form of a bitstream, for storage or transmission, also as an example. When necessary, the entropy-coding unit 130 may also perform entropy-coding on spatial prediction direction information, quantization step size information, motion vector information, and transform block size information, for example. The rearrangement of the order of the quantized data may also be performed prior to the entropy-coding.

In order for the video encoder to generate the reference frame to be used for the temporal/spatial prediction coding of operation 510, the quantized data generated in operation 530 undergoes inverse quantization and inverse transform coding and is added by a previously used prediction value for restoration.

In other words, the quantized data generated in operation 530 is inversely quantized by the inverse quantization unit 140 and the inversely quantized data is inversely transform coded by an inverse transform coding unit, e.g., the 8×8 inverse transform coding unit 150 or the 4×4 inverse transform coding unit 152, for each color component according to the transform block size that was used for the coding. Next, the temporal/spatial prediction compensation unit 160 temporally/spatially predicts the current block to be encoded using a currently formed reference frame, a motion compensation vector to be transmitted, and spatial prediction direction information and adds the predicted block to the inversely transform coded data, thereby generating the reference frame.

Figure 6:
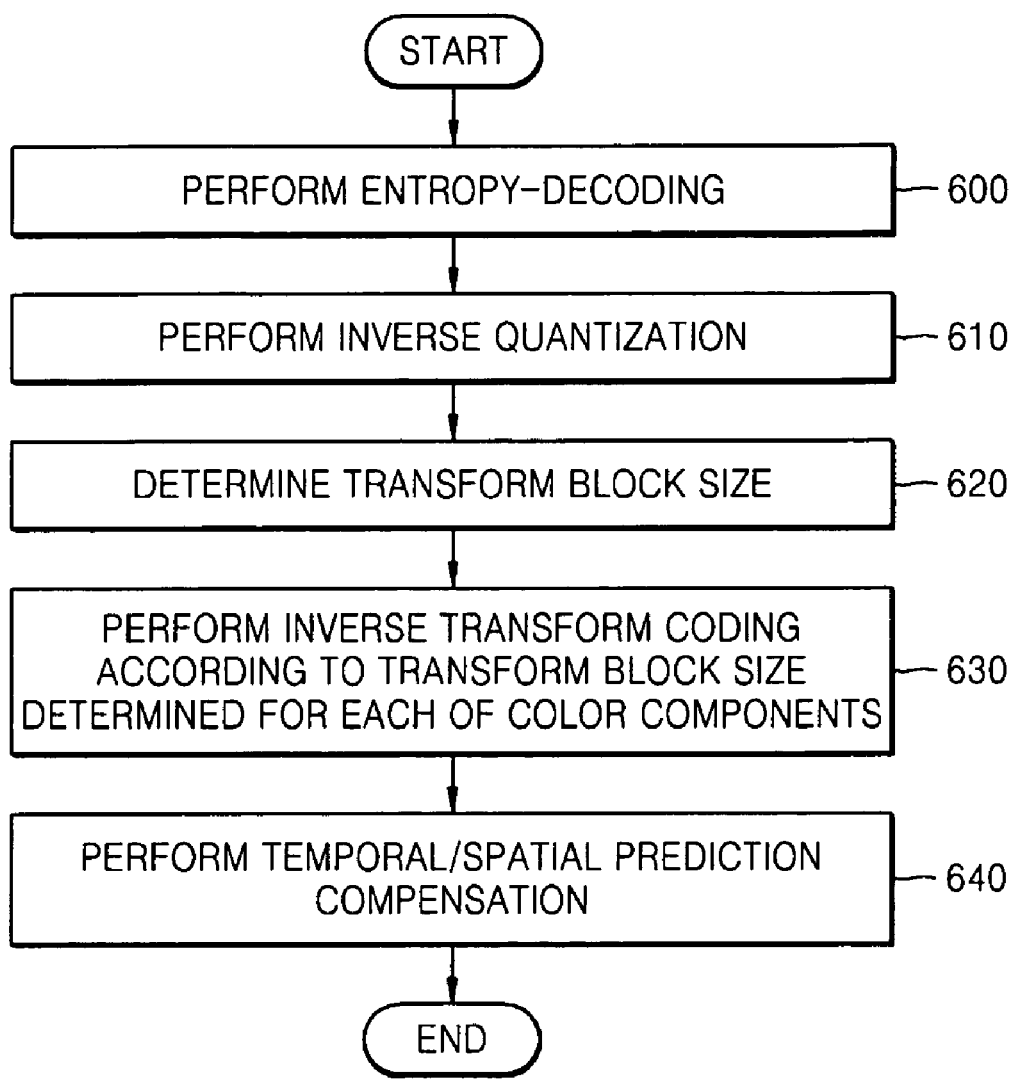
FIG. 6 illustrates a variable block transform method, as a video decoding method using variable block transform, according to an embodiment of the present invention.

FIG. 6 illustrates a variable block transform method, as a video decoding method using variable block transform, according to an embodiment of the present invention.

In operation 600, the entropy-decoding unit 400 performs entropy-decoding on a bitstream received from the NAL, for example. When a prediction mode of a macroblock, a quantization step size, motion vector information, and transform block size information are included in the received bitstream, the entropy-decoding unit 400 performs entropy-decoding on the included information for restoration. The rearrangement of the order of the quantized data may also be performed prior to the entropy-decoding.

In operation 610, the inverse quantization unit 410 inversely quantizes data requiring inverse quantization and inverse transform coding among the entropy-decoded data and transmits the inversely quantized data to the variable block inverse transform unit 420.

In operation 620, the transform block size determination unit 422 determines the transform block size for each component of the coded video using the transform block size information provided from the entropy-decoding unit 400. At this time, if the format is YCbCr 4:2:0 and a setting has been made to use only a transform block size of 4×4 for chrominance components in a video encoder/decoder, the received bitstream does not need to include transform block size information for the chrominance components, i.e., Cb and Cr components. In this case, the transform block size determination unit 422 controls the inverse transform coding unit 424 to perform 4×4 inverse transform coding.

If a setting has been made to use the same transform block size for the Cb component and the Cr component in the video encoder/decoder, the transform block size determination unit 422 may be provided with a single piece of transform block size information for the chrominance components from the entropy-decoding unit 400 and may determine the transform block size to be used for the inverse transform coding of the two components, e.g., the Cb component and the Cr component.

If a setting has been made to use the same transform block size for all components, such as all three of the R, G, and B components, in the video encoder/decoder, the transform block size determination unit 422 may again be provided with a single piece of transform block size information from the entropy-decoding unit 400 and may determines the transform block size to be used for the inverse transform coding of the three components.

In operation 630, a 8×8 inverse transform coding unit, e.g., the 8×8 inverse transform coding unit 426 or the 4×4 inverse transform coding unit 428, performs inverse transform coding on each component of the inversely quantized data using the transform block size determined in operation 620. In other words, inverse transform coding, such as IDCT, may be performed according to the transform block size for each component based on the restored transform block size information provided from the entropy-decoding unit 400.

In operation 640, the temporal/spatial prediction compensation unit 430 restores a block of the current frame $F'_n$ using the reference frame reconstructed through decoding and the inversely transform coded data. The restoration is performed in the manner as mentioned above. The restored block is used for the temporal/spatial prediction of a next block.

As described above, according to an embodiment of the present invention, transform coding may be performed using a transform block size that is varied adaptively according to given video characteristics, e.g., a format and/or the characteristics of components within the format, thereby improving video compression efficiency.

In particular, by improving the variable block transform of the current H.264/AVC, where only a luminance component is variable block transformed, variable block transform can be performed on the remaining color components. Thus, high compression efficiency can be obtained with the minimum change to a conventional H.264 structure.

Meanwhile, embodiments of the present invention may also be embodied as computer-readable code on a medium, such as a computer-readable recording medium. The medium may be any data storage device that can store/transfer data which can be thereafter read by a computer system. Examples of the medium may include read-only memory (ROM), random-access memory (RAM), CD-ROMs, magnetic tapes, floppy disks, optical data storage devices, and carrier waves (e.g., transmission over the Internet), for example. The computer-readable recording medium may also be distributed over network coupled systems so that the computer-readable code is stored/transferred and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A system for variable block transform, comprising:
   a transform block size determination unit to designate at least one transform block size for components of an input video, based on a format of the input video, defining the components, and/or respective characteristics of the components, wherein components designated as having a same transform block size are grouped together and the transform block size is similarly designated for the group; and
   a transform coding unit to perform transform coding on each of the components according to the designated at least one transform block size.

2. The system of claim 1, wherein the transform coding unit further outputs transform coefficients based upon the performed transform coding.

3. The system of claim 1, wherein the transform block size determination unit designates the at least one transform block size for each of the components according to a predetermined rule.

4. The system of claim 3, wherein the predetermined rule includes designating a same transform block size to all components in a group, wherein components are grouped according to related characteristics, and with there being at least two groups of components.

5. The system of claim 1, wherein the transform block size determination unit designates a same transform block size for a Cb component and a Cr component when the format is a YCbCr color format.

6. The system of claim 1, wherein the transform block size determination unit designates a same transform block size for an R component, a G component, and a B component when the format is an RGB color format.

7. The system of claim 1, wherein the transform block size determination unit designates a same transform block size for an R component and a B component when the format is an RGB color format.

8. The system of claim 1, wherein transform block sizes are selectively designated to be one of 4×4 and 8×8.

9. A method for variable block transform, comprising:
   designating at least one transform block size for components of an input video, based on a format of the input video, defining the components, and/or respective characteristics of the components, wherein components designated as having a same transform block size are grouped together and the transform block size is similarly designated for the group; and
   performing transform coding on each of the components according to the designated at least one transform block size.

10. The method of claim 9, further comprising generating transform coefficients based upon the performed transform coding.

11. The method of claim 9, wherein, in the designating of the at least one transform block size, a same transform block size is designated for a Cb component and a Cr component when the format is an YCbCr color format.

12. The method of claim 9, wherein, in the designating of the at least one transform block size, a same transform block size is designated for an R component, a G component, and a B component when the format is an RGB color format.

13. A video encoder, comprising:
   a variable block transform unit to perform transform coding on components of an input video, based on a format of the input video, defining the components, and/or respective characteristics of the components of the input video, and to output corresponding transform coefficients, wherein a transform block size for each of the components of the input video is designated based on the format of the input video and each component designated as having a same transform block size is grouped together and the transform block size is similarly designated for the group; and a quantization unit to quantize the transform coefficients.

14. The video encoder of claim 13, wherein the variable block transform unit comprises:
a transform block size determination unit to designate at least one transform block size based on the format and/or the corresponding characteristics of the components; and
a transform coding unit to perform transform coding on each of the components based on the designated at least one transform block size.

15. The video encoder of claim 14, further comprising an entropy-coding unit to perform entropy-coding on the quantized coefficients and to output the entropy-coded coefficients as a bitstream.

16. The video encoder of claim 15, wherein the entropy-coding unit performs entropy-coding on information about the designated at least one transform block size.

17. The video encoder of claim 16, wherein the transform block size determination unit designates the designated at least one transform block size for each of the components according to a predetermined rule, and
the entropy-coding unit performs the entropy-coding on the information about the designated at least one transform block size, and outputs the entropy-coded information as a bitstream.

18. The video encoder of claim 17, wherein the predetermined rule includes designating a same transform block sizes to all components in a group, wherein components are grouped according to related characteristics, and with there being at least two groups of components, and
the entropy-coding unit performs the entropy-coding on the information about the designated at least one transform block size, as designated for each group.

19. The video encoder of claim 16, wherein the transform block size determination unit designates a same transform block size for a Cb component and a Cr component when the format is an YCbCr color format, and
the entropy-coding unit performs the entropy-coding on only one of information about the same transform block size of the Cb component and information about the same transform block size of the Cr component.

20. The video encoder of claim 16, wherein the transform block size determination unit designates a same transform block size for an R component, a G component, and a B component when the format is an RGB color format, and
the entropy-coding unit performs the entropy-coding on only one of information about the same transform block size of the R component, information about the same transform block size of the G component, and information about the same transform block size of the B component.

21. The video encoder of claim 14, wherein the transform coding unit collects DC coefficients for each of color components from the transform coefficients, performs Hadamard transform on the collected DC coefficients, and outputs the Hadamard-transformed transform coefficients.

22. The video encoder of claim 21, wherein, when the at least one designated transform block size is 8×8, the transform coding unit collects four DC coefficients for each of the components from the transform coefficients in four 8×8 blocks, performs 2×2 Hadamard transform on the collected DC coefficients, and outputs the Hadamard-transformed transform coefficients.

23. A video encoding method, comprising:
performing transform coding on components of an input video based on a format of the input video; defining the components; and/or -respective characteristics of the components, and generating corresponding transform coefficients, wherein a transform block size for each of the components of the input video is designated based on the format of the input video and each component designated as having a same transform block size is grouped together and the transform block size is similarly designated for the group; and
quantizing the transform coefficients for generating an encoded video bitstream.

24. The video encoding method of claim 23, wherein the performing of the transform coding comprises:
designating at least one transform block size based on the format and/or the respective characteristics of the components; and
performing transform coding on each of the components of the input video based on the designated at least one transform block size.

25. The video encoding method of claim 24, further comprising performing entropy-coding on the quantized coefficients and outputting the entropy-coded coefficients as a bitstream.

26. The video encoding method of claim 25, wherein, in the performing of the entropy-coding, the entropy-coding is performed on information about the designated at least one transform block size.

27. The video encoding method of claim 26, wherein,
in the designating of the at least one transform block size, a same transform block size is designated for a Cb component and a Cr component when the format is an YCbCr color format, and
in the performing of the entropy-coding, the entropy-coding is performed on only one of information about the same transform block size of the Cb component and information about the same transform block size of the Cr component.

28. The video encoding method of claim 26, wherein,
in the designating of the at least one transform block size, a same transform block size is designated for an R component, a G component, and a B component when the format is an RGB color format, and
in the performing of the entropy-coding, the entropy-coding is performed on only one of information about the same transform block size of the R component, information about the same transform block size of the G component, and information about the same transform block size of the B component.

29. A video decoder for decoding encoded input video data, comprising:
a variable block inverse transform unit to perform variable block inverse transform on inversely quantized data related to components of the encoded input video data based on a format of the encoded input video data, defining the components, or respective characteristics of the components using predetermined corresponding transform block size information provided for and/or with the encoded input video data, wherein components designated as having a same transform block size are grouped together and the transform block size is similarly designated for the group.

30. The video decoder of claim 29, further comprising an inverse quantization unit to inversely quantize the encoded input video data.

31. The video decoder of claim 29, wherein the variable block inverse transform unit comprises:
a transform block size determination unit determine at least one previously designated transform block size for the components based on the format and/or the respective characteristics of each of the components, using the provided predetermined corresponding transform block size information; and
an inverse transform coding unit to perform inverse transform coding on each of the components of the inversely quantized data based on the determined at least one transform block size.

32. The video decoder of claim 31, further comprising an entropy-decoding unit to perform entropy-decoding an input bitstream and to output the encoded input video data.

33. The video decoder of claim 32, wherein the entropy-decoding unit performs entropy-decoding of the input bitstream to decode the provided predetermined, corresponding transform block size information.

34. The video decoder of claim 31, wherein the transform block size determination unit determines the previously designated transform block size for each of the components based on a predetermined rule using the provided predetermined corresponding transform block size information.

35. The video decoder of claim 34, wherein
the predetermined rule includes having a same transform block size designated to all components in a group, wherein components are grouped according to related characteristics, and with there being at least two groups of components, and
the transform block size determination unit extracts transform block size of each group using the provided predetermined corresponding transform block size information and correspondingly determines the previously designated transform block size for each of the components.

36. The video decoder of claim 31, wherein the transform block size determination unit determines a same transform block size was previously designated for a Cb component and a Cr component when the format is an YCbCr color format, using the provided predetermined corresponding transform block size information.

37. The video decoder of claim 31, wherein the transform block size determination unit determines a same transform block size was previously designated for an R component, a G component, and a B component when the format is an RGB color format, using the provided predetermined corresponding transform block size information.

38. The video decoder of claim 31, wherein the inverse transform coding unit collects DC coefficients for each of the components of the inversely quantized data and performs inverse transform coding on data obtained through an inverse Hadamard transform of the collected DC coefficients and AC coefficients.

39. A video decoding method, comprising:
performing transform decoding on components of an encoded input video based on a format of the encoded input video, defining the components; and/or respective characteristics of the components of the encoded input video and generating corresponding transform coefficients, wherein components designated as having a same transform block size are grouped together and the transform block size is similarly designated for the group; and
inverse quantizing the transform coefficients for decoding the encoded input video.

40. The video decoding method of claim 39, wherein the inverse quantizing of the transform coefficients comprises:
determining at least one previously designated transform block size for the components based on the format and/or each of the respective characteristics of the components using predetermined corresponding transform block size information provided for and/or with the encoded input video data; and
performing inverse transform coding on each of the components of the inversely quantized data according to the determined at least one transform block size.

41. The video decoding method of claim 40, further comprising performing entropy-decoding on an input bitstream to obtain the encoded input video data.

42. The video decoding method of claim 41, wherein, in the performing of the entropy-decoding, the entropy-decoding is performed on the input bitstream to obtain the predetermined corresponding transform block size information.

43. The video decoding method of claim 40, wherein, in the determining of the at least one transform block size, a same transform block size is determined for a Cb component and a Cr component when the format is an YCbCr color format, using the predetermined corresponding transform block size information.

44. The video decoding method of claim 40, wherein, in the determining of the at least one transform block size, a same transform block size is determined for an R component, a G component, and a B component when the format is an RGB color format, using the predetermined corresponding transform block size information.

45. A non-transitory medium storing computer readable code to implement the method of claim 9.

46. A non-transitory medium storing computer readable code to implement the method of claim 23.

47. A non-transitory medium storing computer readable code to implement the method of claim 39.

* * * * *

UNITED STATES PATENT AND TRADEMARK OFFICE
CERTIFICATE OF CORRECTION

PATENT NO.       : 7,925,107 B2
APPLICATION NO.  : 11/489483
DATED            : April 12, 2011
INVENTOR(S)      : Wooshik Kim et al.

Page 1 of 1

It is certified that error appears in the above-identified patent and that said Letters Patent is hereby corrected as shown below:

Column 16, Line 8, In Claim 1, delete "video," and insert -- video --, therefor.

Column 16, Line 9, In Claim 1, delete "components," and insert -- components --, therefor.

Column 16, Line 45, In Claim 9, delete "video," and insert -- video --, therefor.

Column 16, Line 46, In Claim 9, delete "video," and insert -- video --, therefor.

Column 16, Line 46, In Claim 9, delete "components," and insert -- components --, therefor.

Column 16, Line 67, In Claim 13, delete "video," and insert -- video --, therefor.

Column 17, Line 1, In Claim 13, delete "video," and insert -- video --, therefor.

Column 17, Line 1, In Claim 13, delete "components," and insert -- components --, therefor.

Column 18, Line 8, In Claim 23, delete "video;" and insert -- video --, therefor.

Column 18, Line 9, In Claim 23, delete "components;" and insert -- components --, therefor.

Column 18, Line 9, In Claim 23, delete "-respective" and insert -- respective --, therefor.

Column 18, Line 62, In Claim 29, delete "data," and insert -- data --, therefor.

Column 18, Line 63, In Claim 29, delete "components," and insert -- components --, therefor.

Column 19, Line 24, In Claim 33, delete "predetermined," and insert -- predetermined --, therefor.

Column 19, Line 36 (Approx.), In Claim 35, delete "components ," and insert -- components, --, therefor.

Column 20, Line 10, In Claim 39, delete "video," and insert -- video --, therefor.

Column 20, Line 10, In Claim 39, delete "components;" and insert -- components --, therefor.

Signed and Sealed this
Sixth Day of March, 2012

David J. Kappos
*Director of the United States Patent and Trademark Office*